United States Patent [19]

Nor

[11] Patent Number: 5,179,335

[45] Date of Patent: Jan. 12, 1993

[54] BATTERY CHARGER

[75] Inventor: Jiri K. Nor, Oakville, Canada

[73] Assignee: Norvik Inc., Oakville, Canada

[21] Appl. No.: 253,703

[22] Filed: Oct. 6, 1988

[30] Foreign Application Priority Data

Oct. 9, 1987 [CA] Canada ................................. 549011

[51] Int. Cl.⁵ .............................................. H02J 7/10
[52] U.S. Cl. ...................................... 320/21; 320/32; 320/39
[58] Field of Search ................... 320/21, 20, 32, 39, 320/40

[56] References Cited

U.S. PATENT DOCUMENTS

| | | | |
|---|---|---|---|
| 3,531,706 | 9/1970 | Mullersman | 320/35 X |
| 3,576,487 | 4/1971 | Chase | 320/39 |
| 3,593,100 | 7/1971 | Foster | 320/22 |
| 3,890,556 | 6/1975 | Melling et al. | 320/21 |
| 4,021,717 | 5/1977 | Furuishi et al. | 320/21 X |
| 4,061,956 | 12/1977 | Brown et al. | 320/21 X |
| 4,131,841 | 12/1978 | Bennefeld | 320/23 |
| 4,668,901 | 5/1987 | Furukawa | 320/21 X |
| 4,670,703 | 6/1987 | Williams | 320/21 X |
| 4,684,871 | 8/1987 | Plagge | 320/21 |
| 4,746,852 | 5/1988 | Martin | 320/21 X |
| 4,977,364 | 12/1990 | Kordesch et al. | 320/21 |

OTHER PUBLICATIONS

Kordesch—"Charging Method For Batteries, Using the Resistance-Free Voltage as Endpoint Indication" *Journal Electrochemical Soc.*, vol. 113, Aug. 1972, pp. 1053-1055.

*Primary Examiner*—R. J. Hickey
*Attorney, Agent, or Firm*—Donald E. Hewson

[57] ABSTRACT

A charger for charging rechargeable batteries including circuitry for supplying electrical charging power to said rechargeable battery so as to rapidly charge said rechargeable battery, interrupting circuitry for repeatedly interrupting said electrical charging power to said rechargeable battery for a preselected timed interval so as to permit the detection of the internal resistance free voltage of said battery during said interruption of said power, electrical comparing circuitry for comparing the internal resistance free voltage of said battery with a preselected reference voltage, and electrical control circuitry for reducing said power to said battery when said internal resistance free voltage exceeds said preselected reference voltage so as to reduce gradually the rate of charging of said rechargeable battery and maintain said internal resistance free voltage of said battery at said preselected reference voltage.

47 Claims, 10 Drawing Sheets

BATTERY CHARGER

FIELD OF INVENTION

The invention relates to a battery charger and particularly relates to a battery charger for rapidly charging a battery in response to a feedback signal from the internal resistance free electrochemical potential of a battery.

BACKGROUND OF THE INVENTION

Rechargeable batteries have experienced a wide range of usage in today's society. Rechargeable automotive batteries have traditionally been used in automobiles, while sealed batteries or cells such as nickel cadmium batteries are also widely used.

In order to recharge said batteries several different kinds of chargers have heretofore been proposed and utilized. Such chargers may be broadly classified as simple chargers or feedback chargers. Simple chargers basically function without feedback, that is without monitoring the state of the battery and adjusting the charging current in response thereto.

Since rechargeable batteries tend to produce gases internally on overcharging capable of rupturing the battery, and also overheat and damage the battery upon overcharging, such simple chargers have traditionally been constructed to deliver a low level charge as modern day cell construction is capable of withstanding even prolonged overcharging provided such overcharging rate is maintained at a low level.

Accordingly, simple chargers have been constructed to:
(a) deliver a constant low current (sometimes referred to as trickle chargers) to prevent damage to the battery due to over charging, or;
(b) charge over a timed interval.

Furthermore, simple chargers have been constructed to deliver a constant voltage charge whereby the charge current is reduced to zero or trickle as the battery voltage rises. Moreover, simple chargers have been modified to increase the internal charger resistance to provide a "taper" characteristic whereby the charge current gradually tapers down to a trickle as the battery voltage rises.

However, such simple chargers provide a battery with a non-optimal charge profile and thereby provide conservative charge rates resulting in long charge times.

More sophisticated chargers commonly referred to as feedback chargers or closed loop chargers employ some means of monitoring the state of charge of the battery in order to:
(a) provide high charge currents during the first part of the charge cycle; and
(b) reduce and eventually stop charging when full charge has been reached.

Such chargers vary in design according to the type and size of the battery to be charged, degree of sophistication and other factors. Such chargers use various monitored battery parameters such as cell voltage, cell temperature, charge time or a specific feature such as temperature rise or rate of voltage rise to effect control of the charge current in a feedback loop configuration.

For example, U.S. Pat. No. 3,531,706 discloses a charger which supplies a battery with an initial rapid charge rate followed by a trickle charged current in response to the cell temperature and cell voltage of the battery.

Feedback chargers used in the past have monitored the overall cell voltage which consists of the sum of the:
(a) open cell potential,
(b) the electrochemical component of the overvoltage, plus
(c) the resistive component of the overvoltage.

Feedback chargers which monitor the overall voltage of a battery that includes the resistive component of cell overvoltage, or the open cell potential, yield unreliable results as such voltages vary with the age history of the battery, that is the number of times or lengths of time over which a battery has been discharged, recharged, overcharged, deep discharged or damaged.

Internal resistance free method in testing fuel cells and batteries have been described in various articles including K. Kordesch and A. Marko "Sine Wave Pulse Current Tester for Batteries", J. Electrochem Soc. Vol. 107, pages 480-83 (1960). This method by virtue of eliminating the resistive component of the cell overvoltage caused by the cell internal resistance, allows measurement of the electrochemical cell potential, which as described above is the sum of the open cell potential and the electrochemical component of overvoltage. This electrochemical cell potential provides a good indication of the internal state of the cell, related to the type of chemistry of the cell, passing Current and electrochemical performance of its elements, but not affected by the resistance of conductors, electrodes and electrolyte.

In order to obtain reliable internal resistance free potential readings, certain precautions must be followed, as particularized in the following paragraphs.

After the abrupt termination of the current pulse, cell voltage tends to the open circuit voltage over a period of time. This complex transient is characterized by several time constants. The first and relatively fast transient, is the electrical transient, related to the electrical resistance, capacitance and inductance of the conductors, electrodes, and electrolyte. This time constant is typically in the range of microseconds to hundreds of microseconds. The second transient which is related to the electrochemical polarization (concentration polarization, transport phenomena, gassing etc.) is much slower, with time constants typically in the range of 100-1000 milisecond or even longer. It is important, for proper and precise detection of the internal resistance (IR) free potential, to take the reading after the electrical transient has safely died out, and before the equilibrium of the electrochemical process had time to change. From our experience, proper delay is in the range of 0.5 to 10 ms, while for most small "flashlight" cells the best value is about 1-3 ms.

A strobing technique which extracts the value of the cell potential at this predetermined exact time after the abrupt interruption but disregards the cell potential before and after this exact moment yields reliable internal resistance free potential readings.

It is an object of this invention to produce a feedback charger which is more efficient, safe and reliable than previously used.

It is a further object of this invention to produce a feedback charger with electrical characteristics controlled by feedback derived from the internal resistance free electrochemical potential of the battery.

FEATURES OF INVENTION

It is an aspect of this invention to provide a charger for charging rechargeable batteries including; electrical circuitry for supplying the electrical charging power to a rechargeable battery so as to rapidly charge said rechargeable battery, electrical circuitry for repeatedly interrupting said electrical charging power to said rechargeable battery for a preselected time interval so as to permit the detection of the internal resistance free voltage of said battery during said interruption of said electrical charging power, comparator circuitry for comparing the internal resistance free voltage with a preselected reference voltage, control circuitry for reducing said electrical charging power to said rechargeable battery when said internal resistance free voltage exceeds said preselected reference voltage so as to reduce the rate of charging of said rechargeable battery and maintain said internal resistance free voltage at said preselected reference voltage.

It is another aspect of this invention to provide a charger for charging rechargeable batteries including, a transformer- rectifier for generating D.C. current at a preselected level so as to rapidly charge said rechargeable battery during a first rapid charging interval, electrical interrupting circuitry for interrupting said current to said rechargeable battery for a selected time interval so as to permit the detection of the internal resistance free voltage of said battery during said interruption of said current and after the electrical transient subsides, electrical circuitry for generating a preselected reference voltage, electrical comparator circuitry for comparing said internal resistance free voltage of said battery with said preselected reference voltage, and electrical control circuitry activated by said electrical comparator circuitry for reducing said current during a second reduced power charging interval when said internal resistance free voltage equals or exceeds said preselected reference voltage so as to reduce the rate of charging of said rechargeable battery and maintain said internal resistance voltage at said preselected reference voltage.

Another aspect of this invention resides in a method of charging rechargeable batteries including the steps of: supplying an electrical charging power to said rechargeable batteries so as to rapidly charge said rechargeable battery; repeatedly interrupting said electrical charging power to said rechargeable battery for a preselected time interval so as to permit the detection of the internal resistance free voltage of said battery during said interruption of said electrical charging power; comparing said internal resistance free voltage of said battery with a preselected reference voltage; reducing said electrical charging power when said internal resistance free voltage of said battery exceeds said preselected reference voltage so as to reduce the rate of charging of such rechargeable battery and maintain said internal resistance free voltage at said preselected reference voltage.

Yet another aspect of this invention resides in a method of charging rechargeable batteries including the steps of: generating a D.C. current at a preselected level so as to rapidly charge said rechargeable battery during a first rapid charging interval; interrupting said current to said rechargeable batteries for a preselected time interval so as to permit the detection of the internal resistance free voltage of said battery during said interruption of said current; generating a preselected reference voltage; comparing said internal resistance free voltage of said battery with said preselected reference voltage; reducing said current during a second charging interval when said internal resistance free voltage exceeds said preselected reference voltage so as to reduce the rate of charging of said rechargeable battery and maintain said internal resistance voltage at said preselected reference voltage.

DESCRIPTION OF THE INVENTION

Figure 1:
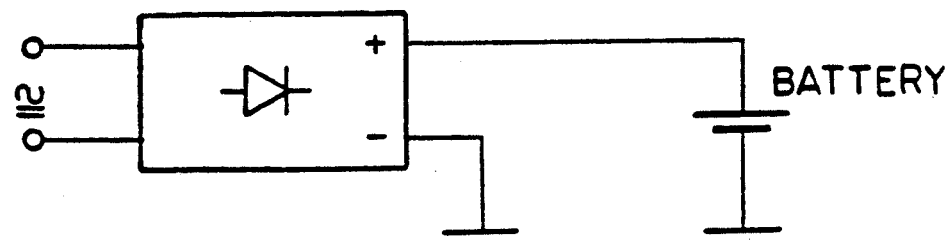
FIG. 1 is a schematic drawing of a simple charger.

FIG. 1 illustrates a simple charger which provides a source of direct current (DC) to which a battery or cell is connected. Since alternating currents (AC) means are often the source of power, transformer-rectifier arrangements are often utilized for simple chargers.

Figure 2:
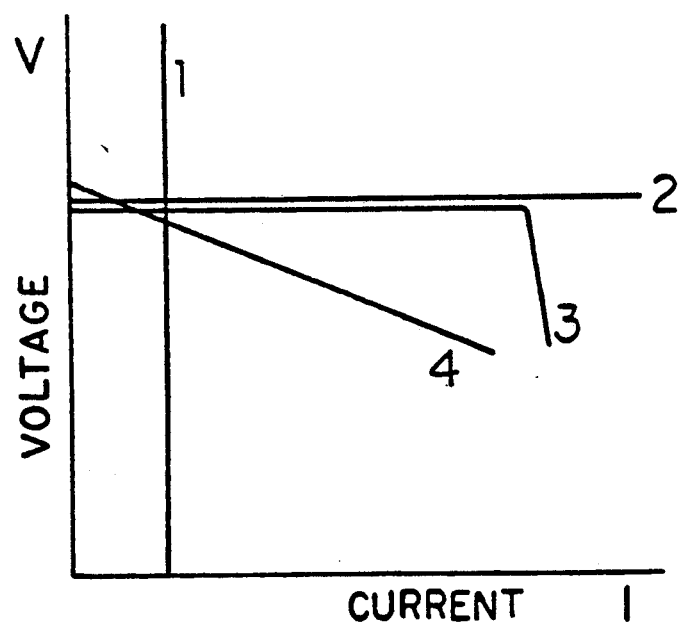
FIG. 2 is a graph illustrating simple charger characteristics.

FIG. 2 is a graph which illustrates the voltage current characteristics of simple chargers. For example, a constant current characteristic of a charger is illustrated in line 1, a constant voltage characteristic charger is illustrated in line 2, a constant voltage with current limit characteristic is illustrated in line 3, and a taper charger with internal resistance is illustrated in line 4.

Figure 3:
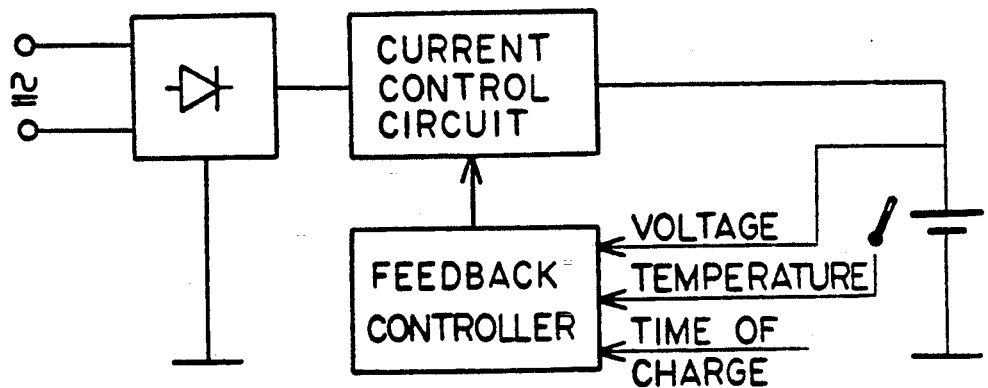
FIG. 3 is a schematic drawing of a feedback charger.

FIG. 3 illustrates the prior art feedback controlled chargers which monitor voltage, temperature, or time of charge.

Figure 4:
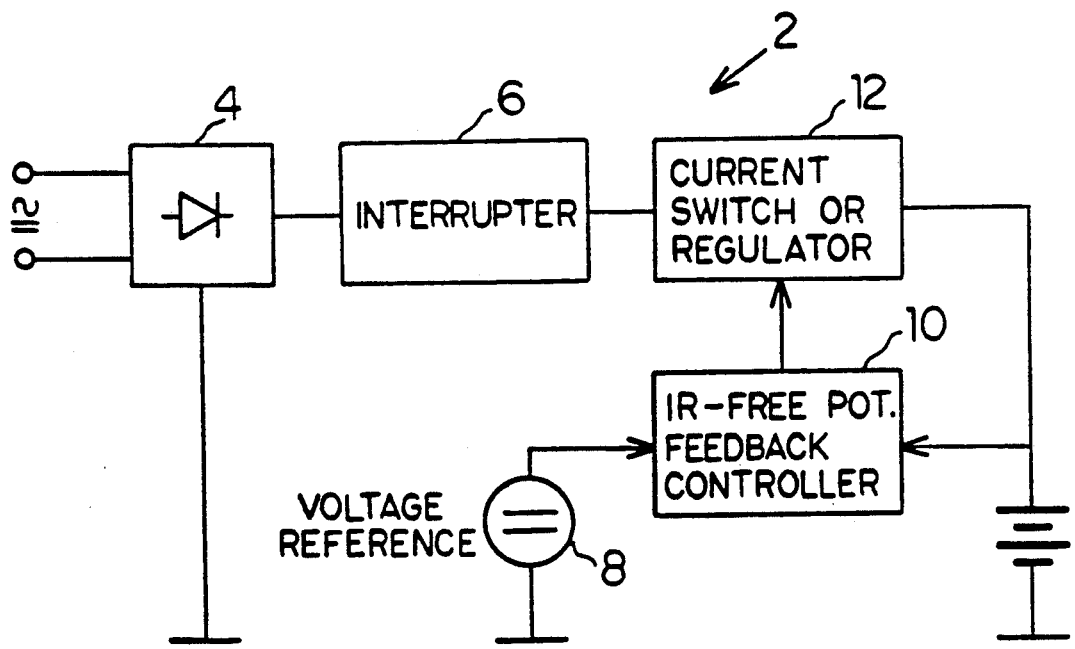
FIG. 4 is a representative drawing of an internal resistance free potential based feedback charger.

FIG. 4 illustrates the very fast charger produced in accordance with this invention and in particular discloses a feedback charger 2 which utilizes the internal resistance free electrochemical cell potential in its feedback loop. Such charger 2 is capable of high charge rates, substantially unaffected by variations of internal resistance of individual cells, and provides for a precise reduction of charging current as the state of charge progresses toward the full charge.

The charger 2 illustrated in FIG. 4 includes a transformer rectifier 4 and interrupter 6.

Interrupter 6 periodically interrupts current i from transformer 4. For example, interrupter 6, at a frequency between 1 per second to 120 per second interrupts current i for a short period of time which may be between a fraction of millisecond to several milliseconds. At the end of this short interruption, and particularly after the electrical transient has subsided, the internal resistance free (IR free) potential of the cell or battery is compared with the reference voltage 8, which reference voltage 8 has been preselected to an appropriate value.

The value of reference voltage 8 depends of the type of battery that is selected for recharging. For example, the reference voltage for a nickel cadmium battery may be set between 1.40-1.50 volts per cell, 1.65-1.75 volts per cell for rechargeable alkaline batteries and 2.35-2.50 volts per cell for lead acid batteries. As long as the internal resistance free cell potential is below the preset value of voltage reference 8, charging continues at full rate. When the internal resistance free cell potential reaches the preset value of voltage reference 8, charging current is gradually reduced through the action of closed loop control 10 and current switch or regulator 12, to a trickle, while maintaining the internal resistance free cell potential at the constant level.

Current control may be achieved by one of several known methods including pulse modulation by means of a current switch (that is duty ratio, pulse width, pulse rate, firing angle, active/inactive pulse) or linear control by means of a current or voltage regulator. Pulse control is often preferable, as it results in greater simplicity and lower overall thermal losses. Only in instances where heat dissipation on the internal battery resistance (battery warming) must be minimized, linear control may be preferred.

The internal resistance free potential is determinable only during the short periods of current interruption. In order to be utilized as a feedback input in a continuous manner, the value of IR free potential must be stored in suitable analog memory device, such as a holding capacitor or a sample-and-hold circuit, which shall be more fully described herein. However, such analog memory device may be dispensed with when the logical method of proportional control by way of pulse modulation or linear control of charge current is utilized wherein the logic decision is based on momentary comparison of the internal resistance free potential and reference voltage. This results in the circuitry having greater simplicity. Therefore the analog sample-and-hold circuit customarily used in the internal resistance free circuitry is not necessary, and a single logical value, or a single bit resulting from the said momentary comparison is retained in memory such as a flip-flop or a latch.

The current interrupter 6 function which is necessary for determination of the internal resistance free potential is derived either from a rectifier where 120 interruptions per second may be utilized in the case of unsmoothed dual rectification of 60 Hz mains, or is performed by the current switch or regulator 12 which miminizes component count and cost. In the case of DC charging from a filtered power source or another battery (for example, charger for flashlight cells operated from a 12 V car battery) a free running timer circuit may be utilized to time the current interruptions.

Various devices may be used to perform the current interruption and/or current control, which devices include power transistor, power Darlington, power FET, adjustable integrated voltage regulator, silicon controlled rectifier (SCR) and triac.

In the case of utilizing a SCR, rectification may also be performed by the same device although it may not mean actual savings because of the greater complexity of the SCR control, whether by zero current switching or edge (firing angle) control.

A visual indicator (which is not specifically referred to in FIG. 4 but which shall be more fully described in relation to FIG. 5) may be utilized. Such visual indicator may take the form of a light emitting diode (LED) and be included in the circuitry. Such visual indicator may be strategically connected to indicate when the charging current is on. During the initial period of charge, such indicator will be fully on; but when the cutoff point is reached, the flashes will be separated by visible gaps, and eventually become infrequent. This provides an indication when the battery should be taken off the charger.

Specific reference shall now be made to FIGS. 5 through 11 which illustrate various embodiments of the invention.

Figure 5:
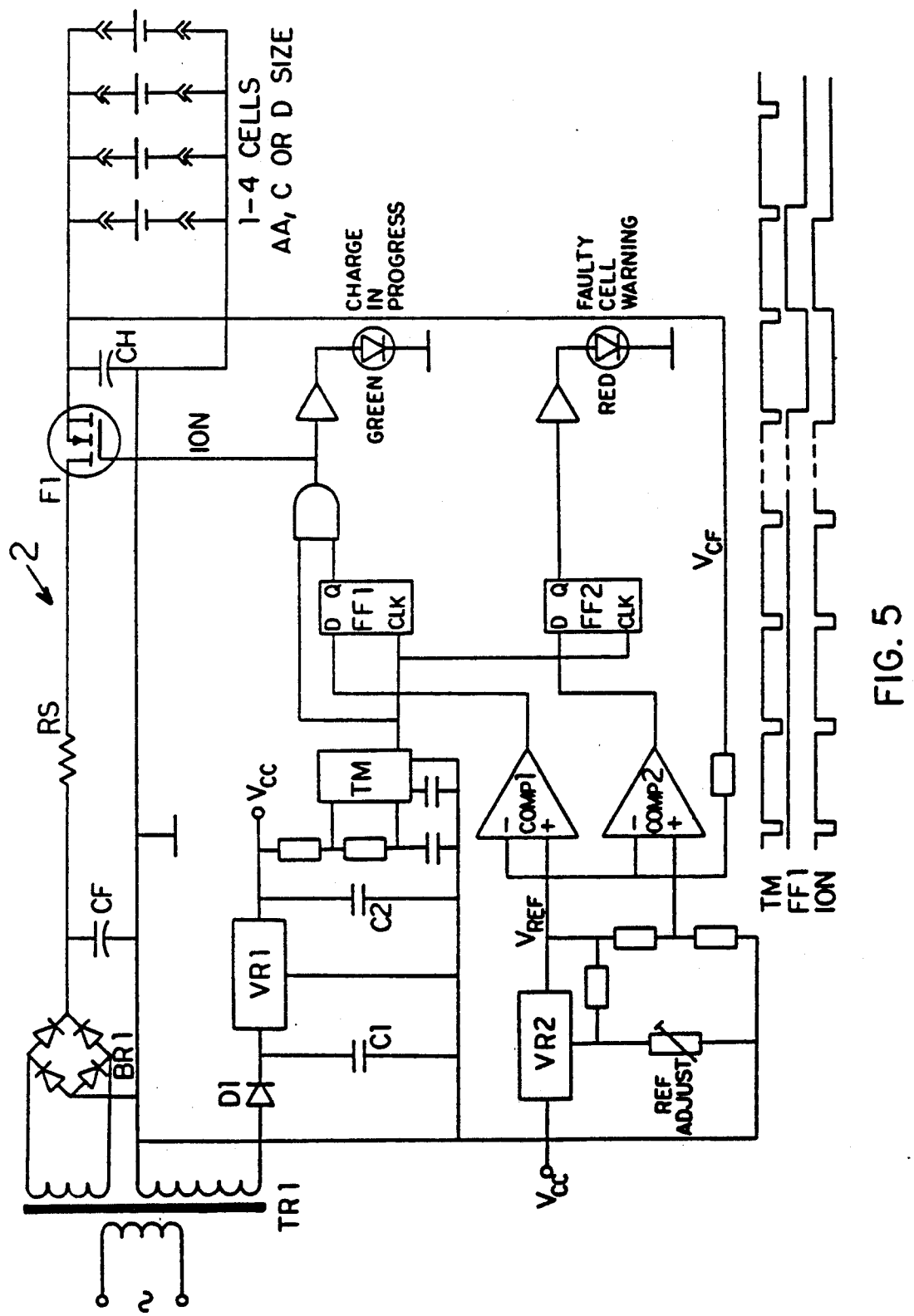
FIG. 5 is a drawing of a charger with filtered direct current and pulse control.

FIG. 5 illustrates one embodiment of the invention. The AC power is transformed to low voltage by means of transformer TR1, rectified by bridge rectifier BR1, and smoothed by capacitor CF to a low value of ripple. One to four cells in parallel are connected via series resistor RS and FET switch F1. The series resistor RS increases slightly the internal resistance of the charger 2, resulting in a taper charger type characteristic. The beneficial effect of this arrangement is that larger cells or cells with lower internal resistance, capable of accepting high charge rates, are charged at higher current (for example, four C or D size nickel-cadmium cells may draw 12 A current, while a single AA cell with draw 4 A).

The second winding of TR1 and rectifier D1 followed by capacitor Cl, voltage regulator VR1 and capacitor C2 provide power for the control circuitry.

During the initial period of charging, switch F1 is fully on, save for short interruptions to allow reading of the IR free potential. Clock pulses provided by the timer TM (for example, every 5 milisecond) interrupt the current (for example, for 0.5 milisecond). During the period of interruption, the cell internal resistance IR free potential $V_{CF}$ is compared with the reference voltage $V_{REF}$ by means of comparator COMP1, and strobed into the flip-flop FF1 on the rising edge of the clock pulse at the end of this period. As long as $V_{CF}$ is less than $V_{REF}$ FF1 remains high, and the switch F1 is activated every clock period.

When $V_{CF}$ reaches the $V_{REF}$ level, COMP1 will be low at the strobe time, FF1 will go low as shown in FIG. 5 and will inhibit the current for the next clock period. Action of COMP1 each clock cycle results in provision of just the right number of active current pulses to maintain the IR free cell potential equal to the reference value. While 80-90% of full charge may be delivered during the initial period of full current, the charging is completed by gradually diminishing current at constant $V_{CF}$. The initially solid light of the CHARGE IN PROGRESS indicator will flicker with gradually decreasing duty ratio, indicating that the battery is ready to be taken off the charger.

One of the chief advantages of the charger 2 according to this invention is that it charges the battery (cell) at a very high rate as long as the cell is capable of accepting the charge, and slows down to a trickle or stops when full charge has been delivered, thus preventing overcharging with resultant danger of gassing and heating. Because the electrochemical potential is determined by the chemistry of the cell (its main constituents), it has been found that cells of the same type but different manufacture differ only minutely in the electrochemical cell potentials, though their terminal voltages under charge or under load, and their ability to accept charge, may differ widely due to different internal construction, size, previous life history, use or abuse. It has been determined through extensive tests that usually only the following two conditions are potentially dangerous to the cell or charger:

(a) the cell (battery) is put on a charger designed for cells of a different kind, or
(b) the cell has an internal short, or
(c) the cell is accidentally put on charger in reverse.

Condition (a) referred to above may be prevented by good labelling of the product; often cells of different types are of different physical size and cannot be easily mistaken. Condition (b) is relatively frequent among the nickel-cadmium cells; for this reason, a safety circuit, a shorted cell detector has been added as illustrated in FIG. 5. This circuit may also detect condition (a) in some circumstances.

The "shorted cell" or "low potential" detector compares the IR free potential with a preset value, typically between 60 and 80% of the cut-off value, and turns on a warning indicator such as LED or sound alarm when the cell potential is low. This warning circuit will also detect an incorrect battery type, provided the potential difference is large enough, or a cell in reverse.

This circuit is also capable of detecting a shorted cell in a battery of several cells. Considering the spread between discharged and fully charged cell potentials, the practical limit will be 3–4 cells in series. For this reason, preference is given to a charger design where all cells are charged in parallel, or in a series-parallel connection with only 2 cells in series.

Comparator COMP2 and flip-flop FF2 of FIG. 5 constitute the warning circuit. As the cells are put on the charger one by one, it is easy to see which cell causes the red FAULTY CELL warning indicator light. This circuit is not repeated in the following FIGS. 6 and 7 but, of course, may be included in any such variation.

Some cells (e.g. nickel-cadmium, some lead-acid) are designed to withstand prolonged deep discharge. In such state, they will give low potential indication initially. However, if the cell is healthy, the warning light will go off in the first minute of charging. It has also been found that rapid charging with the charger according to this invention usually cures (removes) interval shorts in nickel-cadmium cells during the first minute of charge. If the low potential condition persists beyond the first minute, the cell should be removed from the charger before it may dangerously overheat.

Figure 6:
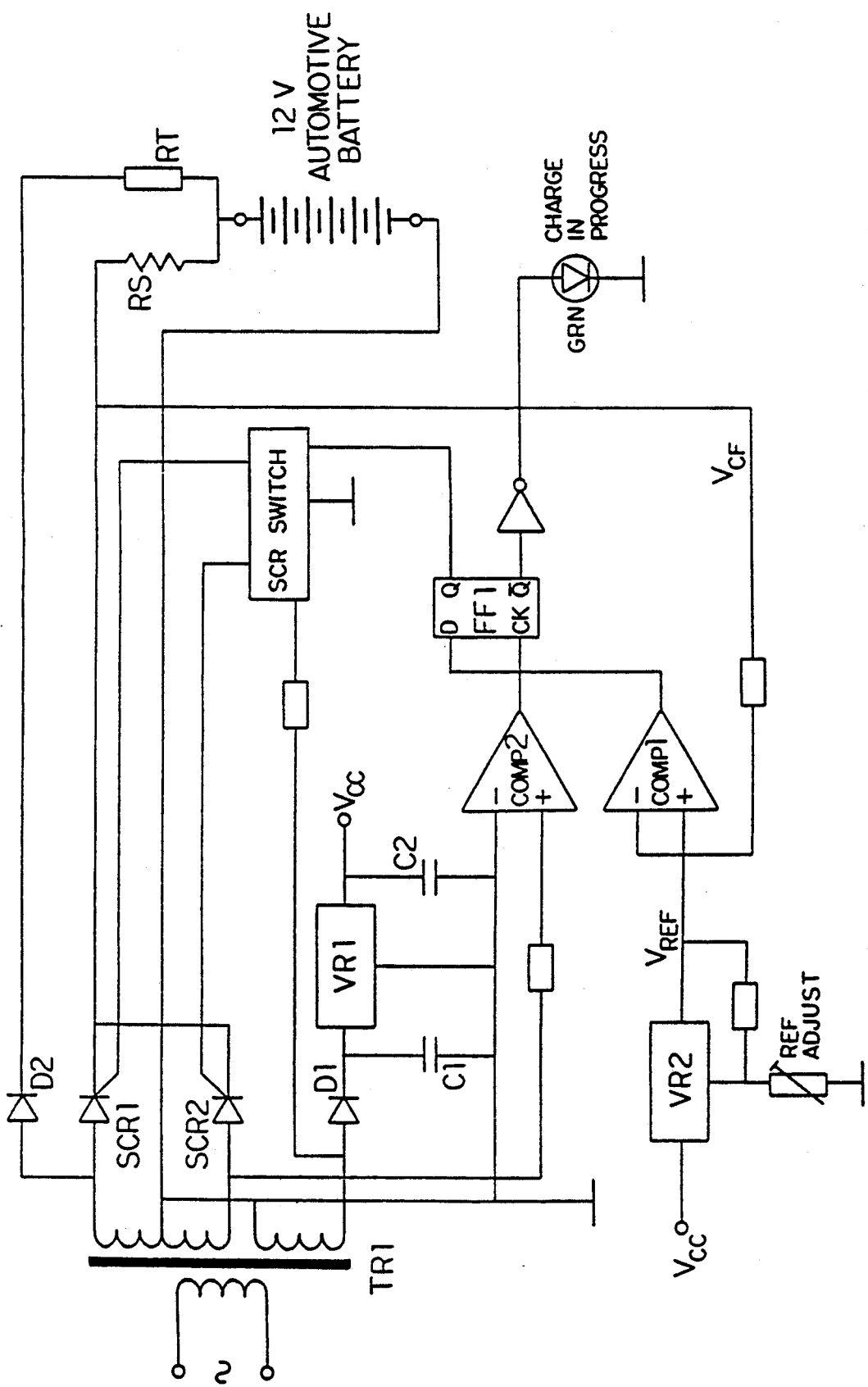
FIG. 6 is a representative drawing of a charger with unfiltered pulsed direct current and pulse control.

FIG. 6 illustrates another embodiment of the invention. In this case, the AC current is rectified by the silicon controlled rectifiers SCR1 and SCR2, and delivered unsmoothed to the cells being charged.

The control circuit works in the manner described in FIG. 5. The circuit is synchronized with the mains frequency by means of the zero-crossing detector COMP2 which strobes the output of COMP1 into the flip-flop FF1, at the time when the transformer TR1 output voltage is zero, between the current pulses. Flip-flop FF1 controls the SCR switch and the CHARGE IN PROGRESS indicator. In a manner similar to the previous embodiment described in FIG. 5, silicon control rectifiers SCR1 and SCR2 are fired every cycle of the mains frequency. When the cut-off voltage is reached, the firing angle of SCR1 and SCR2 will be progressively reduced following the decreasing duty ratio of output of FF1, and the CHARGE IN PROGRESS indicator will flicker. FIG. 6 also illustrates the use of a dual rate charge configuration. More particularly a trickle charge circuit comprised of rectifier D2 and trickle charge resistor RT is arranged in parallel with the main charging circuit. This circuit, which can be adapted to provide approximately 50–100 mA current for small cells (AA through D), aids in the final phase of charging to reach the full charge faster, and provide a sharper cut-off (to a lower total trickle current value) than is otherwise achieved with the pulse control alone.

Figure 7:
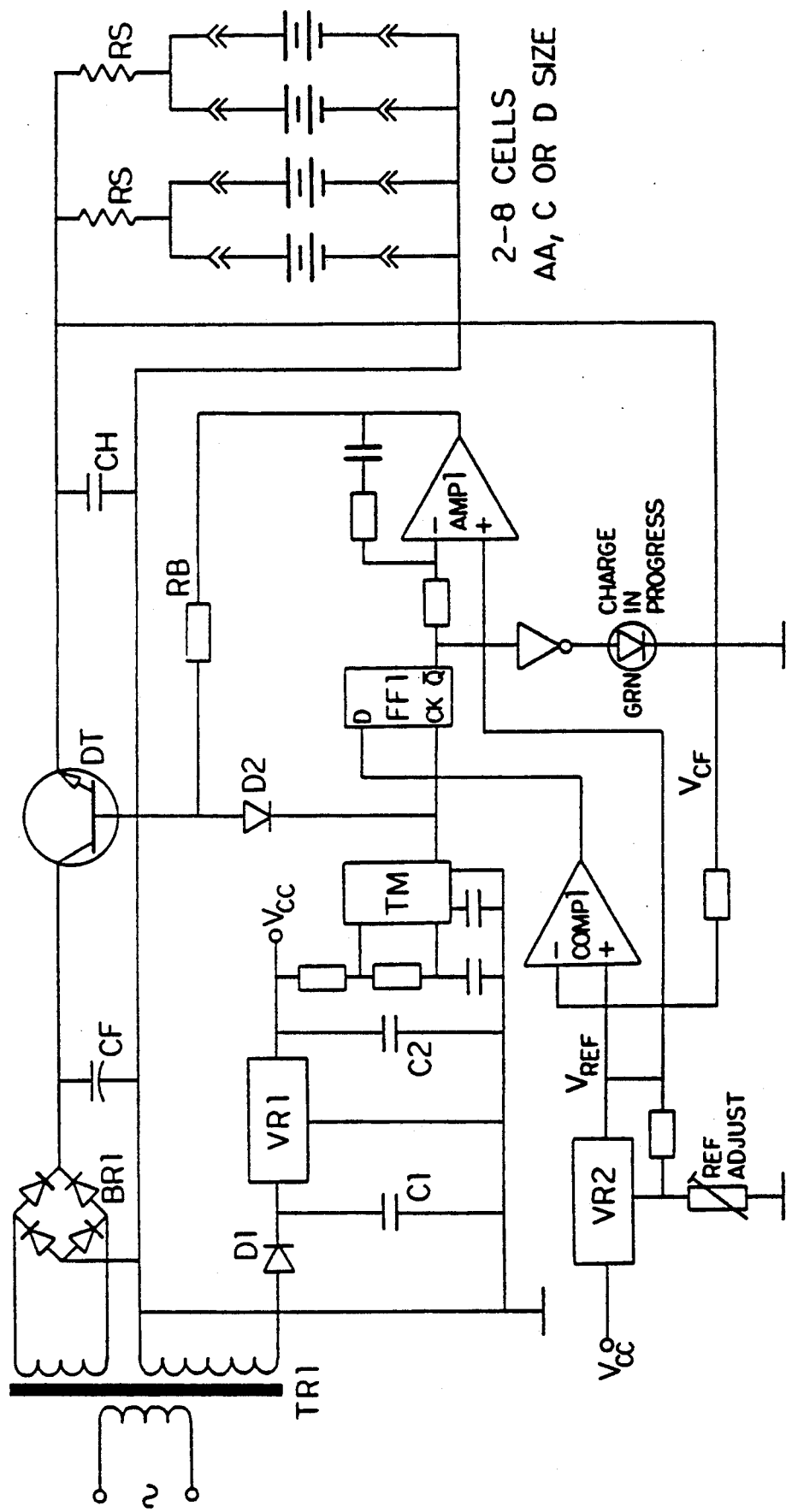
FIG. 7 is a drawing of a charger with filtered direct current and proportional control.

Another embodiment of the invention is shown in FIG. 7. This embodiment employs linear control of the charge current rather than pulse modulation. In this case, the output of flip-flop FF1, the logical form of the error function, serves as input to the controller AMP1. During the initial full current charge, flip-flop FF1 is high, and so is the output of control amplifier AMP1, driving the Darlington transistor pair DT fully on. When $V_{CF}$ rises to equal or exceed $V_{REF}$, flip-flop FF1 begins to miss pulses, and AMP1 will lower the base drive of DT to reduce the charge current proportionally and maintain the equilibrium $V_{CF}3$ equal to $V_{REF}$.

The periodic short interruptions allowing the internal resistance IR free readings are also performed by the Darlington DT. In the low phase of the clock waveform, the base of DT is pulled down via diode D2, and the current is interrupted. In the high phase, D2 isolates the clock line from the base of DT, and the analog base drive is unaffected.

Figure 8:
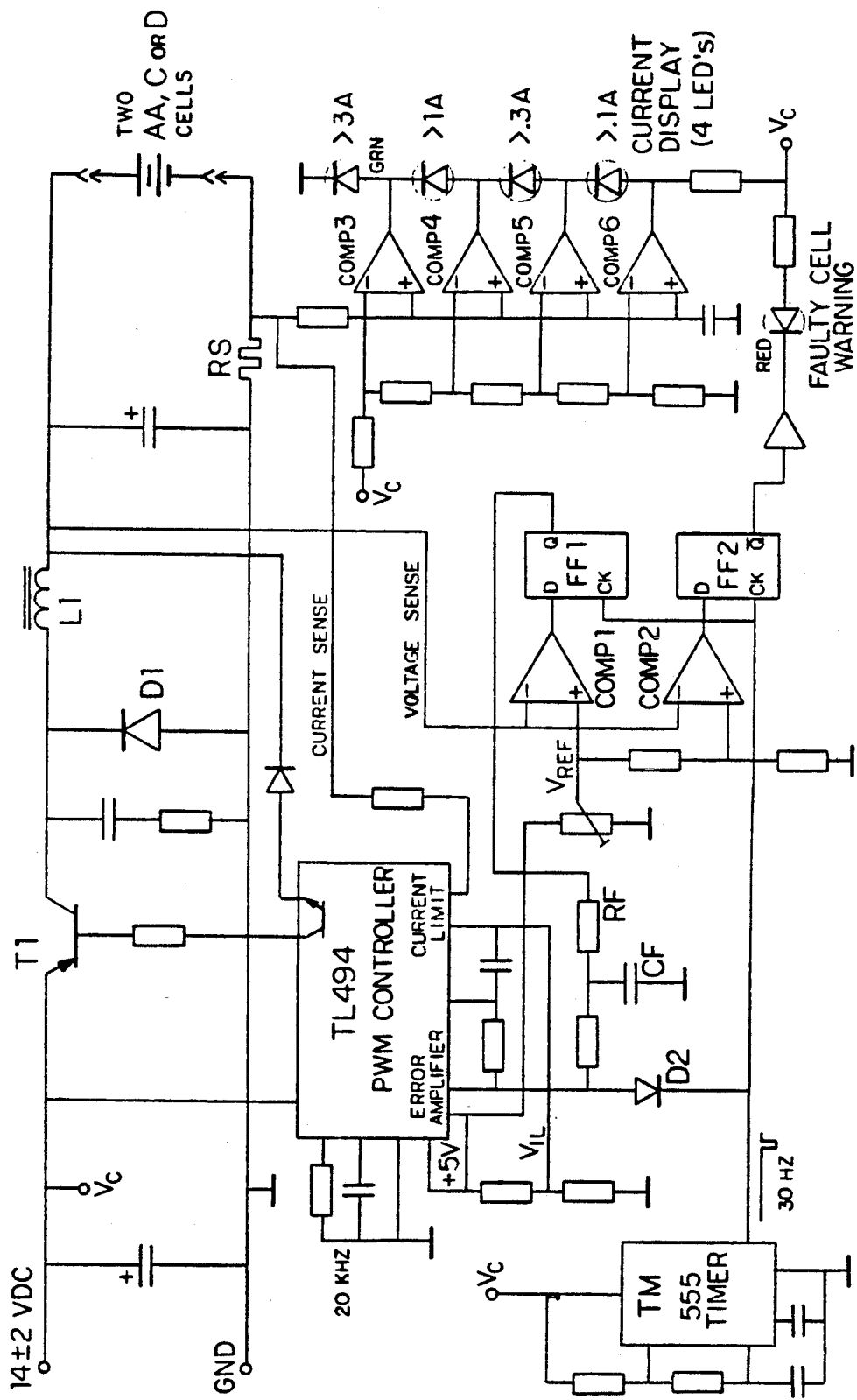
FIG. 8 illustrates another embodiment of the invention of a charger which plugs into a car cigarette lighter socket.

FIG. 8, discloses another embodiment of the invention. More particularized FIG. 8 illustrates a charger for flashlight cells (AA, C or D) which plugs into a car cigarette lighter socket. Switching transistor T1, fast diode D1 and inductor L1 are the main elements of an efficient switching step-down converter which derives the desired charge current from the car battery supply line. Pulse width modulating (PWM) controller of the type TL494 running at 20 kHz provides the drive pulses for the base of T1. Current sensing resistor RS is situated in the return lead of the charged battery. Current sensing is used to drive the visual current indicator with a light bar made of 4 light emitting diodes (LED's). Four comparators COMP3–COMP6 with current sinking outputs turn on the LED's successively at 0.1, 0.3, 1 and 3 A, so that at current of less than 0.1 A no LED's are on, and at current greater than 3 A all 4 LED's are on. Further, the current sense line is connected to the controller TL494 so that the maximum charging current is limited to approximately 6 A. The voltage sense line is connected, as in previous examples, to comparators COMP1 and COMP2. Reference voltage $V_{REF}$ and the current limit setting $V_{IL}$ are derived from the +5 V reference provided by the controller TL494. Comparator COMP1 and flip-flop FF1 provide the control function as described in the earlier embodiments. Output pulses of FF1 are smoothed by the filter circuit RF–CF and connected to the error amplifier inputs of TL494. Timer TM of the type 555 provides 3 milisecond interruptions every 33 miliseconds, by means od diode D2 connected also to the error amplifier of TL494. At the end of each current interruption, the rising edge of the timer waveform strobes the outputs of COMP1 and COMP2 into flip-flops FF1 and FF2. COMP2 and FF2 comprise the faulty cell or low voltage warning as described in earlier embodiments.

Figure 9:
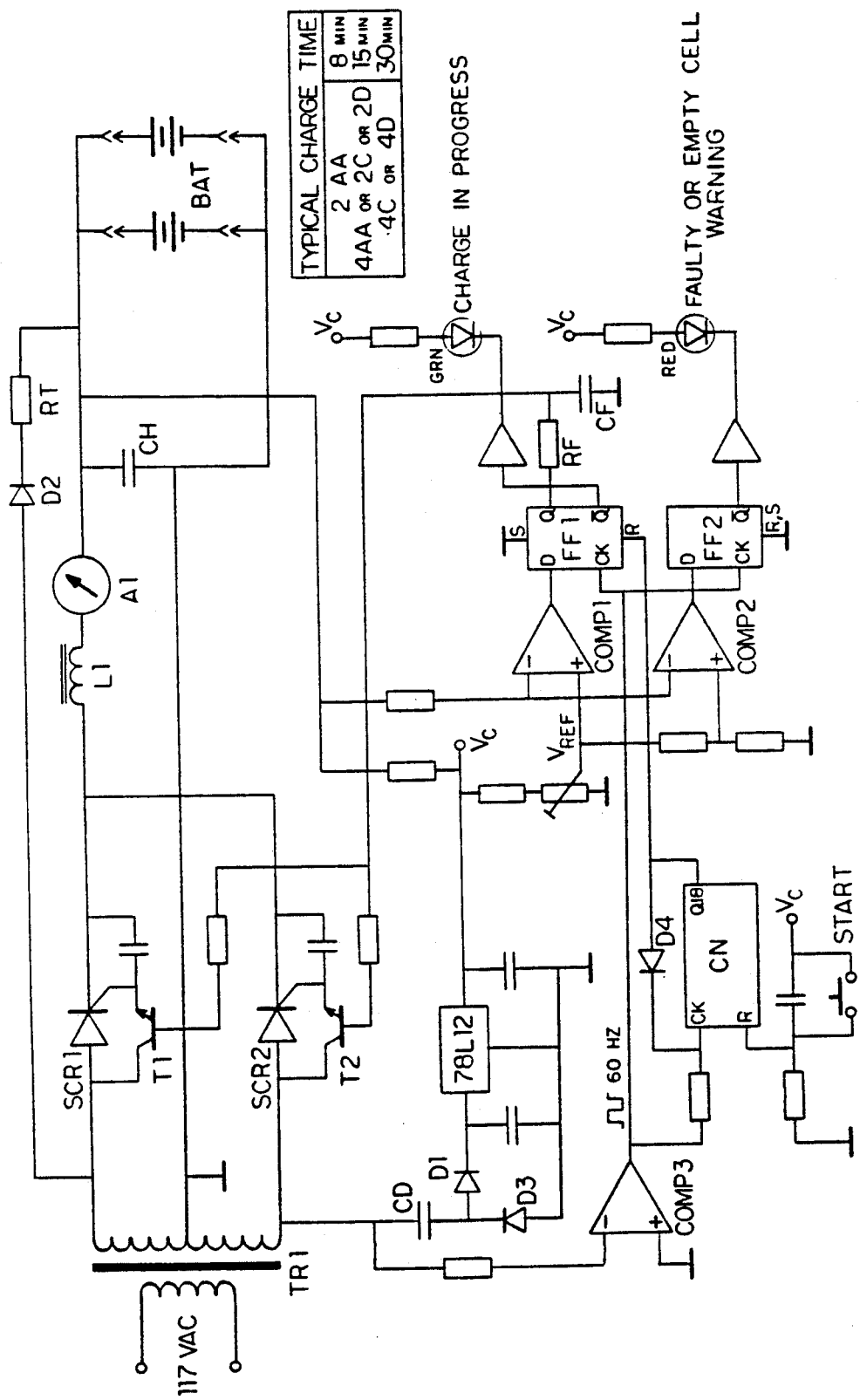
FIG. 9 illustrates another embodiment of the invention with an interrupting timer circuit for preventing thermal runaway.

FIG. 9 is another embodiment of the invention, particularly suitable for charging Ni-Cd cells as it contains one type of a thermal runaway prevention circuit as described in the following.

Nickel-cadmium batteries, due to the negative temperature coefficient of the cell voltage, have been known to exhibit a "thermal runaway" condition when charged at constant voltage. This condition is characterized by continuous, dangerously high charge current flowing into a fully charged battery, at elevated battery temperature.

An optional circuit which prevents such occurrence has been designed and tested, in three varieties:

(a) Interrupting timer circuit. In the simplest implementation an integrated binary counter (frequency divider) is used to break the charging cycle into e.g. 30 minutes ON, 30 minutes OFF. Line frequency (if AC powered) or internal clock (if DC powered) is fed to the input of the divider. To begin the charge, the frequency divider is reset upon power-up, or by a START button. Though charge is usually completed during the first ON period, batteries may be left on the charger indefinitely (i.e. when forgotten by the user), as any heat possibly generated will dissipate during the OFF cycle, and on subsequent ON cycles the charger will deliver only a trickle charge. Alternately, the charger may be configured to remain OFF after completion of the first ON cycle.

(b) One-way controller. During the charge cycle, charge current is gradually decreased from full value to a trickle, as the charge progresses. Thermal runaway might occur if the controller increases the charge current in response to the electrochemical potential lowered as a result of rising battery temperature. This is prevented if the controller is capable of only decreasing the charge current, and never increasing it. Such controller may be realized in many different ways, one of which is described here. As the control voltage must remain stable over long periods of time (that is in the vicinity of hours, days), an integrated circuit again—a counter and a digital-to-analog converter—is used in this function. When flip-flop FF1 described in previous embodiments goes low (signifying the need to decrease the charge current) FF1 enables the counter to advance on the next clock pulse(s), until the charge current is sufficiently reduced. To set the full charge current, the counter is cleared upon power-up or by the START button. There is no danger from repeated pressing of the START button, as in case of partially or fully charged batteries the controller will reduce the current as promptly as necessary.

(c) Variable $V_{REF}$. Values of $V_{REF}$ used for fast charging may result, with some batteries, in high end-of-charge current of 0.2 to 0.5 C (1 C charge rate is defined as current in amperes equal to the capacity of the battery in ampere-hours), which may cause build-up of heat and lead to thermal runaway. Usually it is desirable to reduce the end-of-charge current to a trickle well below the 0.1 C rate. Therefore a circuit has been devised which delivers the bulk of charge at a higher $V_{REF}$ setting, beginning with charge rate of approx. 10 C. When the current dropped below 1 to 2 C, the value of $V_{REF}$ is gradually or stepwise reduced, and the rest or the charge is delivered at this lower $V_{REF}$ setting, resulting in end-of-charge current below 0.05 C typically.

In the fast charger according to FIG. 9, charging current is derived from 117 VAC mains, by means of transformer TR1 with a split secondary, silicon controlled rectifiers SCR1 and SCR2, radio interference suppression circuit with choke L1 and capacitor CH, visual current indicator A1, and receptacles for charging two to four cells of AA, C or D size. Components have been chosen such that the internal resistance of the transformer, rectifiers, choke and the ampere meter limits the charging current at full firing angle to approx. 5 A. Voltage regulator of the type 78L12, aided by voltage doubler consisting of capacitor CD and diodes D1, D3, and associated filter capacitors, provides regulated +12 VDC for the integrated circuits and the voltage reference $V_{REF}$. Voltage sense line is brought to comparators COMP1 and COMP2. COMP1 and flip-flop FF1 provide the charging control function as described in the previous embodiments of this invention.

Output pulses of FF1 are smoothed (averaged) by filter RF-CF. The resulting voltage controls proportionally the firing angle of SCR1 and SCR2 by means of transistors T1, T2 and associated components. Zero-crossing detector COMP3 provides 60 Hz squarewave synchronous with the mains sinewave. Rising edges of this squarewave brought to the clock inputs of FF1 and FF2 provide the strobing function between the charging pulses, some 1.5 ms after the end of every second charging pulse.

The faulty cell warning circuit, COMP2-FF2, is the same as before. The 60 Hz output of COMP3 is also brought to the clock input of the 18-stage binary counter CN which constitutes the thermal runaway prevention circuit of the timer type. In 36 minutes after start, output Q18 goes high with two effects: first, it resets and holds flip-flop FF1 in the low state, shutting off entirely SCR1 and SCR2; second, it inhibits via diode D4 input of the counter CN thus terminating the fast charge cycle. Charge cycle is initiated by resetting the counter CN upon power-up (connecting the charger to the grid) or upon pressing the START pushbutton. After termination of fast charge, a maintenance trickle charge of 50 mA is supplied via diode D2 and resistor RT until the batteries are taken off the charger. With this charger, there is no danger from repeated pressing of the START button. When a new fast charge cycle is imposed upon charged batteries the current rate is brought down to a trickle fast by the action of the IR free potential control circuitry, and the cycle is again terminated in 36 minutes, long before any appreciable heat could build up.

Alternately, deletion of diode D4 will cause the charger to repeat the 36 minute charge cycles, interleaved by 36 minute pauses. Such arrangement also effectively prevents thermal runaway and, as each subsequent cycle tops off the batteries which are left on charger, the trickle charge circuit D2-RT may also be deleted.

The 36 minute period has been chosen somewhat arbitrarily, to contain even the longest charge period needed to charge four C or D cells. There is no need to leave batteries on the charger that long. They can be removed as soon as the current indicator shows significant decline of the charging current or, if only partial charge is desired or sufficient, they can be removed even earlier.

Figure 10:
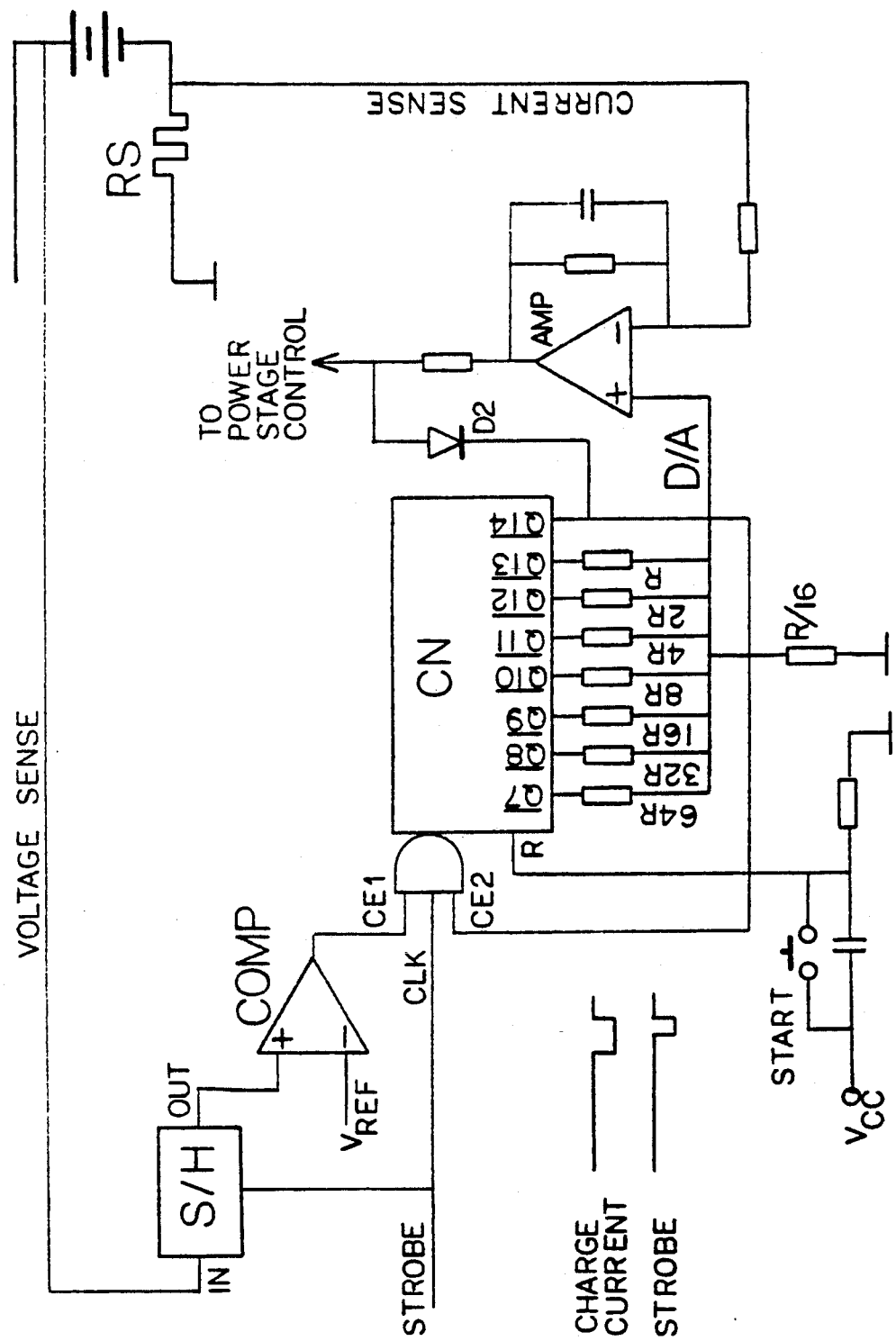
FIG. 10 illustrates a one-way controller thermal runaway prevention circuit.

FIG. 10 illustrates another embodiment of the thermal runaway prevention circuit, described earlier as the one-way controller. In this case, the IR free potential control function is performed by an analog sample-andhold circuit S/H and a comparator COMP. Sampling of the S/H circuit is controlled by strobe pulses derived for example from the timer illustrated in FIG. 7 or 8. The S/H circuit is in the hold mode when the strobe is high and charge current is on, and in the sample mode when the current is interrupted. For best results to avoid the transient, the strobe will go low about 1 ms after the charge current has been interrupted, and will go high when the current interruption ends. The IR free potential is available at the output of the S/H continuously, and is fed to the COMP input. The other COMP input is connected to $V_{REF}$. Initially the charger operates at full current. All outputs of the binary counter CN are high, and the D/A output of the resistor network connected to the counter (which represents a simple 7-bit digital-to-analog converter) is at its highest value. This voltage is fed to the error amplifier AMP. To linearize the charge current control, current sense feedback is used as the other input of AMP; its output drives the power stage. When IR free potential exceeds $V_{REF}$, COMP will go high and raise the clock enable input CE1 of CN. Clock pulses will advance the counter to the extent necessary to maintain IR free potential equal to $V_{REF}$, by lowering the D/A output voltage and, consequently, charge current. There is no mechanism for increasing charge current by automatic feedback action, and the D/A converter will maintain drift-free stable output when charge current has been reduced to a trickle, thus preventing any possible thermal runaway. An interlock is provided, should the counter CN run to the end for whatever reason. In such case the output /Q14 will go low, inhibit fully the charge current by means of diode D2, and pull down counter enable input CE2. The charge cycle is initiated by counter reset upon power up or by pressing the START pushbutton.

It must be stated that in all examples of embodiments of this invention shown here, the IR free potential control function could be performed interchangeably by the combination of the comparator and a flip-flop (COMP1 and FF1) or by the combination fo the sample-and-hold circuit and a comparator (S/H and COMP) as shown in the last example. We have preference for the unconventional combination of comparator and a flip-flop which results in very accurate sampling and control unaffected by hardware (e.g. drift or droop of sample-and-hold circuit) and is realizable with less expensive components than the S/H method.

Figure 11:
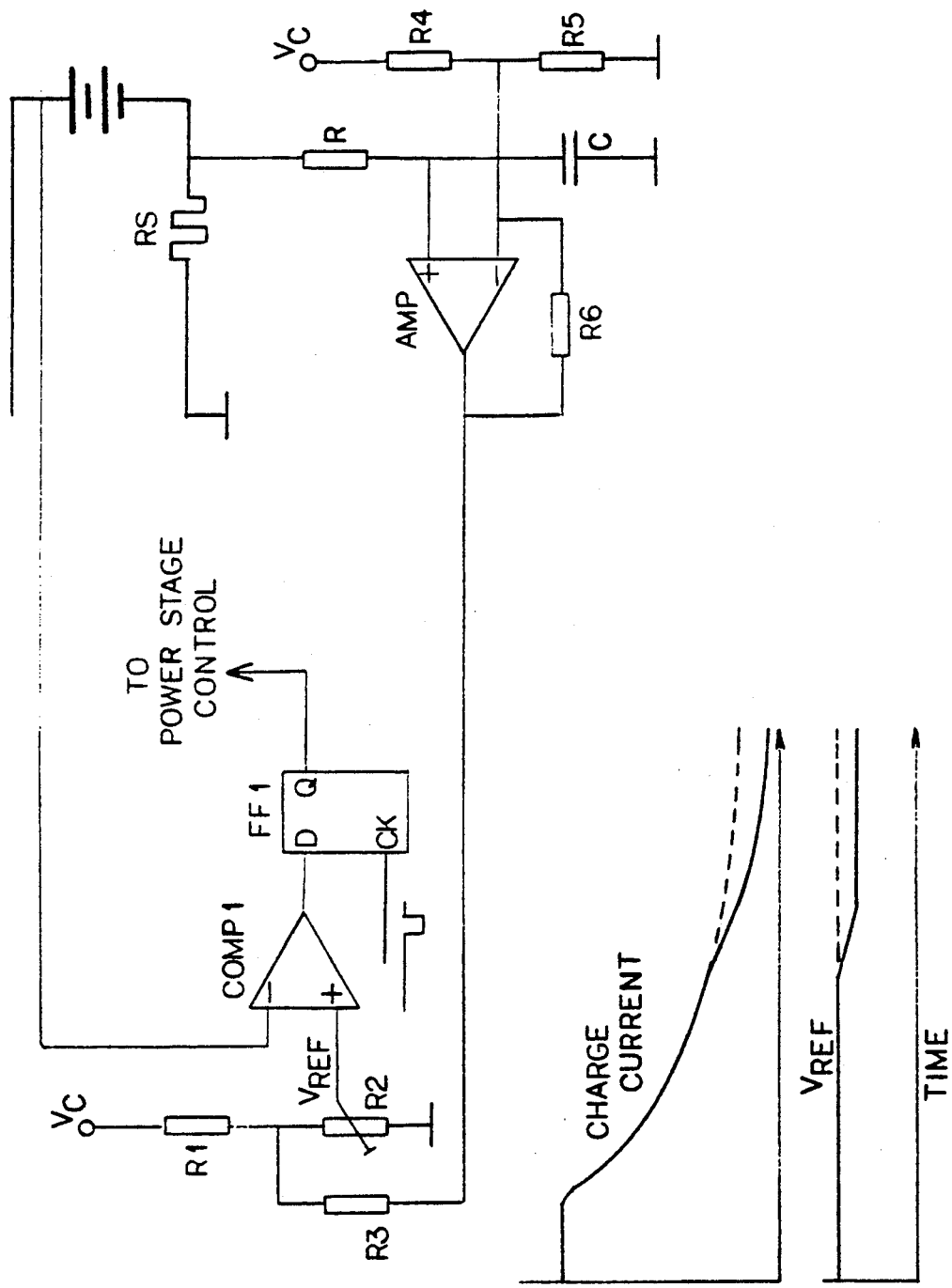
FIG. 11 illustrates a variable reference voltage thermal runaway prevention circuit.

FIG. 11 depicts the thermal runaway prevention circuit for Ni-Cd cells according to the third method referred to earlier. In this embodiment, $V_{REF}$ is derived from $V_C$ by means of resistors R1, R3 and potentiometer R2. Resistor R3 is connected to the output of amplifier AMP which can swing approximately between ground potential and $V_C$, while resistor values are chosen in such a way that high output of AMP results in a higher value of $V_{REF}$ for example, between 1.45 and 1.5 V/cell; and a low output of AMP results in a value of $V_{REF}$ lower by, for example, 0.05 to 0.1 V/cell. Values R4, R5 are chosen so that inputs of amplifier AMP are balanced around 1 C charge rate of battery on charge. When a substantially discharged cell is put on charger the charge current will quickly exceed the 1 C rate even at the lower setting of $V_{REF}$. This will raise $V_{REF}$ to the higher value and facilitate very fast charge at 5-15 C. When the battery is nearly fully charged and the charge current drops below the preset limit around 1 C, $V_{REF}$ will be gradually reduced to the lower value, resulting in the end-of-charge current of 0.01-0.05 C which poses no danger of thermal runaway. The value of resistor R6 determines the sharpness of the transition.

Alternately, a comparator (or series of comparators) may be employed in place of amplifier AMP, causing $V_{REF}$ transition in a step or steps.

Figure 12:
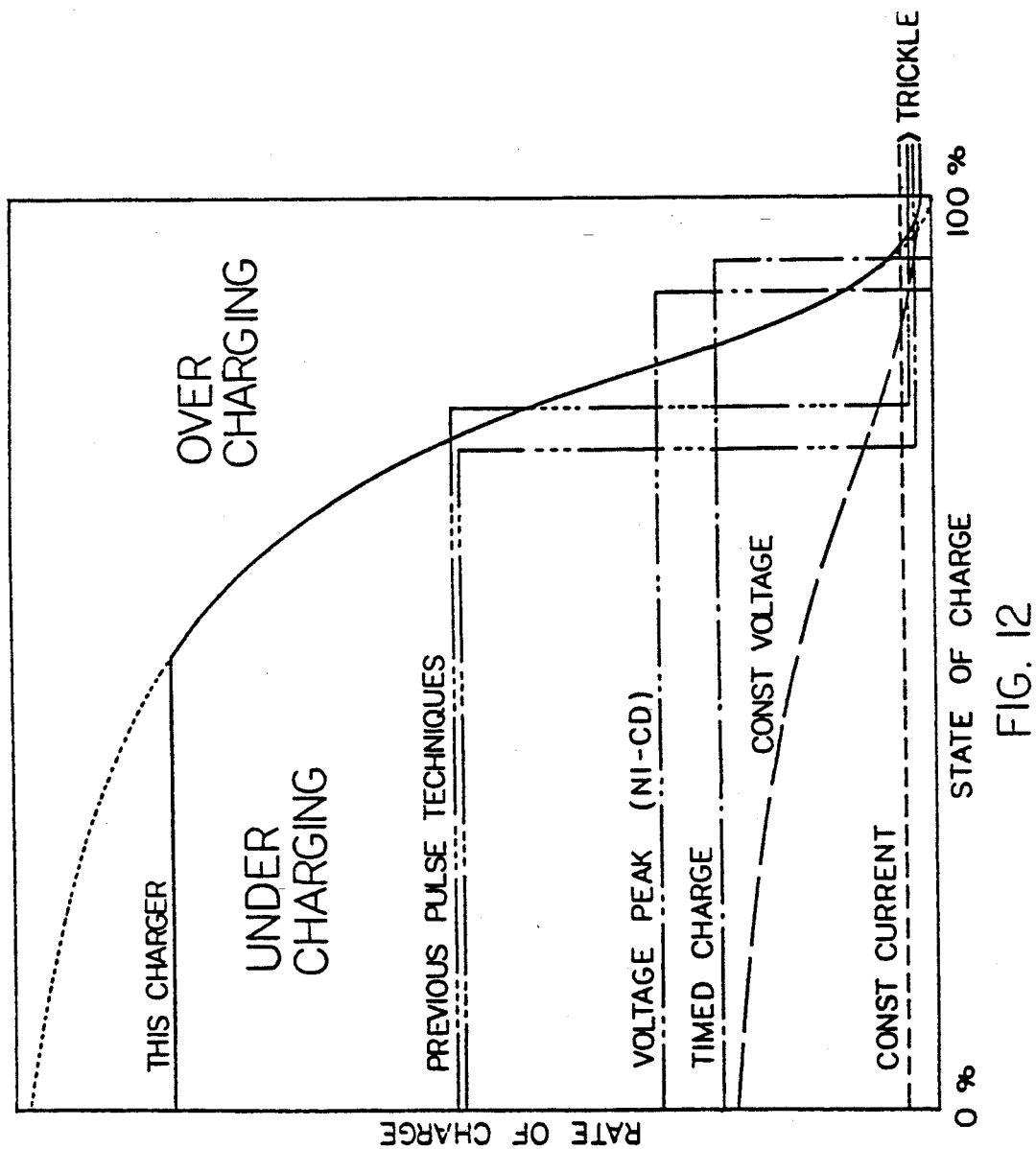
FIG. 12 illustrates a graph comparing prior art chargers with the charger disclosed herein.

FIG. 12 shows a graph which compares the charging processes of prior art chargers with this charger and generally aids in understanding of the invention described herein.

A fully discharged battery (0% state of charge is represented at the left side of the graph) is capable of accepting charge at a high rate. As the charge progresses, the charge carriers still in the discharged state are depleted, their density in the battery is reduced and so is the ability of the battery to accept further charge. Eventually, all carriers will have been turned into the charged state; and full charge (100% state of charge which represented by the right side of the graph) will been reached. The dotted line (partially overlapped by the solid line) represents the ideal, highest charge rate the battery is capable of accepting for the given state of charge.

A fully charged battery cannot accept any extra charge, and to continue pass charging current through the battery (overcharging) cannot further improve the state of charge. Overcharging causes internal gassing and heating of the battery which, if sustained, may damage or even destroy the battery. However, the battery does not have to be fully charged for the state of overcharging to occur. A battery is being overcharged anytime the passing charge current is in excess of the current the battery is capable of accepting. Thus, the area above and to the right of the dotted and solid curve is the region of overcharging. Similarly, we may call the region of current smaller than what the battery can accept, the region of undercharging which is represented under the dotted and solid curve.

Prior art chargers have one characteristic in common: that is they initially "undercharge" the battery but, toward the end, overcharge it. The net result are long charge times, and less than optimal charge conditions which may adversely affect battery life.

In continuous constant current chargers the rate of charge is set usually to a C/10 to C/16 ("overnight" chargers) value incapable of destroying or seriously damaging the battery unless it is forgotten on the charger for many days.

Constant voltage chargers and "taper" chargers achieve a profile with higher initial charge rate, finishing with trickle charge. Results differ, depending on both the electrochemical and internal resistance polarization of the battery.

In timed chargers a constant current charge at a higher rate (often 1-2 C) is utilized and a timer will terminate the charge, thus preventing extensive overcharge. The battery may end up partially or fully charged. It is interesting to note that even a period of overcharging does not guarantee full charge, as the battery is incapable to accept charge fast enough and the excess current represents a condition of abuse that generates heat and gases. Putting a charged battery through another timed cycle could be dangerous.

The voltage peak or delta-V method (Ni-Cd batteries only) chargers again utilize a constant current charge, at typically a 1-3 C rate. When the charge current saturates the battery's ability to accept charge (represented as an intersection with the curve in FIG. 12), the battery voltage rises. Then, as severe overcharging begins, the battery warms up and the cell voltage drops again due to the negative temperature coefficient of the cell voltage. When this peak is detected, the charge is terminated. This method is slightly abusive to batteries because of repeated substantial excursions into the overcharge region and raised temperature. Charged cells, or a combination of cells in different state of charge or different quality may confuse some of these chargers into a runaway condition.

Prior art pulse techniques as taught in U.S. Pat. No. 3,531,706 and U.S. Pat. No. 3,576,487 use constant current charge techniques at a rapid but unspecified rate, and use a pulse technique to sense the cell voltage between charging pulses, so as to determine vicinity of intersection of the constant current charge curve with the curve illustrated in FIG. 12. The prior art devices described in U.S. Pat. Nos. 3,351,706 and 3,576,487 both terminate the rapid charge and cut the current to a trickle when the vicinity of the intersection is detected. Both methods cut off the rapid charge at only partial state of charge, and take a long time to finish charge with trickle current.

An ideal hypothetical charger would follow exactly the profile set by the dotted curved line as partially overlapped by the solid curved line in FIG. 12, adjusting the current to match the ability of battery to accept charge, ending the charge at zero current exactly when 100% state of charge was reached. This would result in the shortest possible charge time, lowest amount of dissipated heat (internal resistance loss only, no heat due to overcharge), and highest coulometric efficiency.

The charger described herein is very near ideal, beginning with a constant current charge at a high rate of 5–10 C. By the time the dotted curve is intersected in the first 3–10 minutes of charge, 50–70% of charge has been delivered. From this moment, the charger follows the ideal curve very closely, adjusting the charge rate down to match the ability of battery to accept charge, finishing off with a trickle charge, which is a very small departure from the ideal hypothetical charger. As with the ideal charger, the result is, with good quality batteries of low internal resistance, extremely fast charge, low dissipated heat, and very high coulometric efficiency which has not heretofore been unattainable with the prior art methods.

The charger according to this application is particularly suitable for batteries with low internal resistance, designed for fast charge/discharge, such as lead-acid and Ni-Cd cells. Special circuits which allow for safe charging of Ni-Cd cells (preventing thermal runaway) are not necessary with other types of cells. Various other rechargeable batteries may be safely charged by this method, according to their ability to accept charge.

It has been found that by using the charger as described herein one can safely charge quality Ni-Cd batteries in a very short time. For example it was found that 50% or more of the charge was delivered to quality Ni-Cd batteries within the first 5 minutes, and substantially full charge completed in 10 to 30 minutes.

Although the preferred embodiments as well as the operation and use have been specifically described in relation to the drawings, it should be understood that variations in the preferred embodiments could easily be achieved by a skilled person in the trade without departing from the spirit of the invention. Accordingly, the invention should not be understood to be limited to the exact form revealed in the drawings.

I claim:
1. A charger for charging rechargeable batteries including:
   (a) means for supplying an electrical charging power at an initial constant predetermined current level to a rechargeable battery initially at a rate in amperes greater than the capacity in ampere-hours of the battery (i.e., greater than 1 C), so as to rapidly charge said rechargeable battery;
   (b) means for detecting the internal resistance free voltage of said rechargeable battery;
   (c) means independent of the battery being charged for providing a preselected reference voltage;
   (d) means for repeatedly interrupting said electrical charging power to said rechargeable battery for a preselected time interval so as to permit the instantaneous detection of the internal resistance free voltage of said battery at a point in time during said interruption of said electrical charging power;
   (e) comparator means for comparing said internal resistance free voltage of said battery with said preselected reference voltage at said point in time and for producing an output logical error signal which is indicative of the value of said internal resistance free voltage compared to said reference voltage;
   (f) logical memory means wherein said output logical error signal from the output of the said comparator means is entered during each preselected time interval; and
   (g) means for gradually reducing said electrical charging power when said internal resistance free voltage of said battery exceeds said preselected reference voltage as indicated by said output logical error signal, whereby the rate of charging of said rechargeable battery at said point in time is reduced so as to maintain said internal resistance free voltage at said preselected reference voltage.

2. A charger as claimed in claim 1 wherein said internal resistance free voltage of said battery is detected during said interruption of said current near the end of said preselected time interval.

3. A charger as claimed in claim 2 wherein said internal resistance free voltage of said battery is determined at the end of said preselected time interval of interruption of said current.

4. A charger as claimed in claim 1 wherein said electrical charging power comprises a D.C. current, and said interrupting means repeatedly interrupts said D.C. current for a preselected timed interval at a preselected frequency so as to determine the internal resistance free voltage of said battery during said interruption of said current.

5. A charger as claimed in claim 2 wherein said interrupting means comprises switch means.

6. A charger as claimed in claim 1 including means for generating a pulsed D.C. current.

7. A charger for charging rechargeable batteries including:
   (a) means for generating a DC current at a preselected level so as to rapidly charge a rechargeable battery initially at a rate in amperes greater than the capacity in ampere-hours of the battery (i.e., greater than 1 C), during a first rapid charging interval;
   (b) means for detecting the internal resistance free voltage of said rechargeable battery;

(c) circuitry means for repeatedly interrupting said current to said rechargeable batteries for a preselected time interval so as to permit the instantaneous detection of the internal resistance free voltage of said battery during said interruption of the said current at a point in time near the end of said preselected time interval;

(d) means independent of the battery being charged for electrically generating a preselected reference voltage;

(e) comparator means for comparing said internal resistance free voltage of said battery with said preselected reference voltage at said point in time and for producing an output logical error signal which is indicative of the value of said internal resistance free voltage compared to said reference voltage;

(f) logical memory means wherein said output logical error signal from the output of the said comparator means is entered during each preselected time interval; and (g) electrical control means activated by said comparator means for gradually reducing said current during a second reduced power charging interval when said internal resistance free voltage exceeds said preselected reference voltage as indicated by said output logical error signal, whereby the rate of charging of said rechargeable battery at said point in time is reduced so as to maintain said internal resistance voltage at said preselected reference voltage.

8. A charger as claimed in claim 7 including transformer rectifier means for generating a pulsed D.C. current.

9. A charger as claimed in 8 wherein the frequency of said interruptions is controlled by the frequency of said pulsed D.C. current.

10. A charger as claimed in 7 including a sample-and-hold circuit means as an analog memory means for accepting the value of the said internal resistance free potential near the end of said current interruption and to retain the value of said internal resistance free potential of said battery during said charging intervals between said current interruptions.

11. A charger as claimed in claim 10 wherein said comparator means subtracts the value of said preselected reference voltage from said internal resistance free voltage of said battery stored in said analog memory means so as to generate an error signal to said control means.

12. A charger as claimed in claim 7 wherein said logical error signal is retained during said charging intervals between said current interruptions by said logical memory means.

13. A charger as claimed in claim 12 wherein said logical memory means comprise latch means.

14. A charger as claimed in claim 7, wherein said control means is configured as a linear control amplifier.

15. A charger as claimed in claim 7, wherein said control means is configured as a pulse modulating circuitry means.

16. A charger as claimed in claim 7 wherein said current control means and said current interruption means are the same means.

17. A charger as claimed in claim 7 including an illuminatable lamp as a charge in progress indicator means connected to said control means, which indicates by said lamp being constantly illuminated that a charge at full rate is in progress, and by said lamp being a flashing lamp that a reduced rate charge is in progress.

18. A charger as claimed in claim 7 including a faulty cell warning circuitry means.

19. A charger as claimed in claim 7 including a trickle charge circuit means in parallel with said D.C. current for rapidly charging said rechargeable battery for reaching the state of full charge faster, and for said trickle charge circuitry means to trickle charge said rechargeable battery when said internal resistance free voltage exceeds said preselected reference voltage.

20. A method of charging rechargeable batteries, including the steps of:

(a) supplying an electrical charging power at an initial constant predetermined current level to at least one rechargeable battery initially at a rate in amperes greater than the capacity in ampere-hours of the battery (i.e., greater than 1 C), so as to rapidly charge said rechargeable battery;

(b) repeatedly interrupting said electrical charging power to said rechargeable battery for a preselected time interval and at a preselected frequency so as to permit the detection of the internal resistance free voltage of said battery during said interruption of said electrical charging power;

(c) instantaneously detecting the internal resistance free voltage of said battery at a point in time during each said interruption;

(d) generating a preselected reference voltage independent of the battery being charged;

(e) comparing said internal resistance free voltage of said battery with said preselected reference voltage at said point in time so as to produce an output logical error signal which is indicative of the value of said internal resistance free voltage compared to said reference voltage;

(f) storing said output logical error signal in a logical memory means during each preselected time interval; and (g) reducing said electrical charging power when said internal resistance free voltage of said battery exceeds said preselected reference voltage as indicated by said output logical error signal at said point in time, whereby the rate of charging of said rechargeable battery at said point in time is reduced so as to maintain said internal resistance free voltage at said preselected reference voltage.

21. A method of charging rechargeable batteries, including the steps:

(a) generating DC current at a preselected level so as to rapidly charge at least one rechargeable battery initially at a rate in amperes greater than the capacity in ampere-hours of the battery (i.e., greater than 1 C), during a first rapid charging interval;

(b) interrupting said current to said rechargeable batteries for a preselected time interval at a preselected frequency so as to permit the detection of the internal resistance free voltage of said battery during said interruption of said current;

(c) instantaneously detecting the internal resistance free voltage of said battery at a point in time during each said interruption;

(d) generating a preselected reference voltage independent of the battery being charged;

(e) comparing said internal resistance free voltage of said battery with said preselected reference voltage at said point in time so as to produce an output logical error signal which is indicative of the value of said internal resistance free voltage compared to said reference voltage;

(f) storing said output logical error signal in a logical memory means during each preselected time interval; and (g) reducing said current during a second reduced power charging interval when said internal resistance free voltage exceeds said preselected reference voltage as indicated by said output logical error signal at said point in time, whereby the rate of charging of said rechargeable battery at said point in time is reduced so as to maintain said internal resistance voltage at said preselected reference voltage.

22. A charger as claimed in claim 1 further including thermal runaway prevention circuitry means.

23. A charger as claimed in claim 22 wherein said thermal runaway prevention circuitry means comprises interrupting timer circuitry means.

24. A charger as claimed in claim 22 wherein said thermal runaway prevention circuitry means comprises one-way controller means.

25. A charger as claimed in claim 22 wherein said thermal runaway prevention circuitry means comprises means to vary said reference voltage means.

26. A charger as claimed in claim 2, wherein said preselected time interval is sufficiently long so as to permit any electrical transient which may have occurred in the voltage being sensed to subside.

27. A charger as claimed in claim 7 wherein said internal resistance free voltage of said battery is detected during said interruption of said current near the end of said preselected time interval.

28. The method of claim 20, wherein said preselected frequency is in the order of from about 2 Hz to about 200 Hz.

29. The method of claim 21, wherein said preselected frequency is in the order of from about 2 Hz to about 200 Hz.

30. A charger for charging rechargeable batteries including:

(a) means for supplying an electrical charging power at an initial constant predetermined current level to said rechargeable battery initially at a rate in amperes greater than the capacity in ampere-hours of the battery (i.e., greater that 1 C) so as to rapidly charge said rechargeable battery;

(b) means for detecting the internal resistance free voltage of said rechargeable battery;

(c) means independent of the battery being charged for providing a preselected reference voltage;

(d) means for repeatedly interrupting said electrical charging power to said rechargeable battery for a preselected time interval of from about 0.5 to about 10 milliseconds so as to permit the instantaneous detection of the internal resistance free voltage of said battery at a point in time during said interruption of said electrical charging power;

(e) means for comparing said internal resistance free voltage of said battery with said preselected reference voltage at said point in time and for producing an output logical error signal which is indicative of the value of said internal resistance free voltage compared to said reference voltage;

(f) logical memory means wherein said output logical error signal from the output of the said comparator means is entered during each preselected time interval; and (g) means for gradually reducing said electrical charging power when said internal resistance free voltage of said battery exceeds said preselected reference voltage as indicated by said output logical error signal, whereby the rate of charging of said rechargeable battery at said point in time is reduced so as to maintain said internal resistance free voltage at said preselected reference voltage.

31. A charger as claimed in claim 35 wherein said means for detecting said internal resistance free voltage of said battery does so during said interruption of said current near the end of said preselected time interval.

32. A charger for charging rechargeable batteries including:

(a) means for generating a DC current at a preselected level so as to rapidly charge a rechargeable battery initially at a rate in amperes greater than the capacity in ampere-hours of the battery (i.e., greater than 1 C), during a first rapid charging interval;

(b) means for detecting the internal resistance free voltage of said rechargeable battery;

(c) circuitry means for repeatedly interrupting said current to said rechargeable batteries for a preselected time interval so as to permit the instantaneous detection of the internal resistance free voltage of said battery during said interruption of the said current at a point in time near the end of said preselected time interval of from about 0.5 to about 10 milliseconds;

(d) means independent of the battery being charged for electrically generating a preselected reference voltage;

(e) comparator means for comparing said internal resistance free voltage of said battery with said preselected reference voltage at said point in time and for producing an output logical error signal which is indicative of the value of said internal resistance free voltage compared to said reference voltage;

(f) logical memory means wherein said output logical error signal from the output of the said comparator means is entered during each preselected time interval; and (g) electrical control means activated by said comparator means for gradually reducing said current during a second reduced power charging interval when said internal resistance free voltage exceeds said preselected reference voltage as indicated by said output logical error signal, whereby the rate of charging of said rechargeable battery at said point in time is reduced so as to maintain said internal resistance voltage at said preselected reference voltage.

33. A charger as claimed in 32 including a sample-and-hold circuit means as an analog memory means for accepting the value of the said internal resistance free potential near the end of said current interruption and to retain the value of said internal resistance free potential of said battery during said charging intervals between said current interruptions.

34. A charger as claimed in claim 32 wherein said logical memory means includes means to retain said logical error signal during said charging interval between said current interruptions.

35. A charger as claimed in claim 32 including an illuminatable lamp as a charge in progress indicator means connected to said control means, wherein when said lamp is constantly illuminated that is an indication that a charge at full rate is in progress; and when said lamp is a flashing lamp, that is an indication that a reduced rate charge is in progress.

36. A charger as claimed in claim 32 including a trickle charge circuit means in parallel with said D.C. current for rapidly charging said rechargeable battery for reaching the state of full charge faster, and for said trickle charge circuitry means to trickle charge said rechargeable battery when said internal resistance free voltage exceeds said preselected reference voltage.

37. A method of charging rechargeable batteries, including the steps of:
   (a) supplying an electrical charging power at an initial constant predetermined current level to at least one rechargeable battery initially at a rate in amperes greater than the capacity in ampere-hours of the battery (i.e., greater than 1 C) so as to rapidly charge said rechargeable battery;
   (b) repeatedly interrupting said electrical charging power to said rechargeable battery for a preselected time interval of from about 0.5 to about 10 milliseconds and at a preselected frequency so as to permit the detection of the internal resistance free voltage of said battery during said interruption of said electrical charging power;
   (c) instantaneously detecting the internal resistance free voltage of said battery at a point in time during each said interruption;
   (d) generating a preselected reference voltage independent of the battery being charged;
   (e) comparing said internal resistance free voltage of said battery with said preselected reference voltage at said point in time so as to produce an output logical error signal which is indicative of the value of said internal resistance free voltage compared to said reference voltage;
   (f) storing said output logical error signal in a logical memory means during each preselected time interval; and
   (g) reducing said electrical charging power when said internal resistance free voltage of said battery exceeds said preselected reference voltage as indicated by said output logical error signal at said point in time, whereby the rate of charging of said rechargeable battery at said point in time is reduced so as to maintain said internal resistance free voltage at said preselected reference voltage.

38. A method of charging rechargeable batteries, including the steps of:
   (a) generating a DC current at a preselected level so as to rapidly charge at least one rechargeable battery initially at a rate in amperes greater than the capacity in ampere-hours of the battery (i.e., greater than 1 C) during a first rapid charging interval;
   (b) interrupting said current to said rechargeable batteries for a preselected time interval of from about 0.5 to about 10 milliseconds at a preselected frequency so as to permit the detection of the internal resistance free voltage of said battery during said interruption of said current;
   (c) instantaneously detecting the internal resistance free voltage of said battery at a point in time during each said interruption;
   (d) generating a preselected reference voltage independent of the battery being charged;
   (e) comparing said internal resistance free voltage of said battery with said preselected reference voltage at said point in time so as to produce an output logical error signal which is indicative of the value of said internal resistance free voltage compared to said reference voltage,
   (f) storing said output logical error signal in a logical memory means during each preselected time interval; and
   (g) reducing said current during a second reduced power charging interval when said internal resistance free voltage exceeds said preselected reference voltage as indicated by said output logical error signal at said point in time, whereby the rate of charging of said rechargeable battery at said point in time is reduced so as to maintain said internal resistance voltage at said preselected reference voltage.

39. The method of claim 37, wherein said preselected frequency is in the order of from about 2 Hz to about 200 Hz.

40. The method of claim 38, wherein said preselected frequency is in the order of from about 2 Hz to about 200 Hz.

41. A charger for charging rechargeable batteries including:
   (a) means for supplying an electrical charging power at an initial constant predetermined current level to said rechargeable battery so as to charge said rechargeable battery;
   (b) means for detecting the internal resistance free voltage of said rechargeable battery;
   (c) means independent of the battery being charged for providing a preselected reference voltage;
   (d) means for repeatedly interrupting said electrical charging power to said rechargeable battery for a preselected time interval of from about 0.5 to about 10 milliseconds so as to permit the instantaneous detection of the internal resistance free voltage of said battery at a point in time during said interruption of said electrical charging power;
   (e) comparator means for comparing said internal resistance free voltage of said battery with said preselected reference voltage at said point in time and for producing an output logical error signal which is indicative of the value of said internal resistance free voltage compared to said reference voltage;
   (f) logical memory means wherein said output logical error signal from the output of the said comparator means is entered during each preselected time interval; and
   (g) means for gradually reducing said electrical charging power when said internal resistance free voltage of said battery exceeds said preselected reference voltage as indicated by said output logical error signal, whereby the rate of charging of said rechargeable battery at said point in time is reduced so as to maintain said internal resistance free voltage at said preselected reference voltage.

42. A charger as claimed in claim 41 wherein said means for detecting said internal resistance free voltage of said battery does so during said interruption of said current near the end of said preselected time interval.

43. A charger for charging rechargeable batteries including:

(a) means for generating a DC current at a preselected level so as to charge a rechargeable battery during a first charging interval;
(b) means for detecting the internal resistance free voltage of said rechargeable battery;
(c) circuitry means for repeatedly interrupting said current to said rechargeable batteries for a preselected time interval so as to permit the instantaneous detection of the internal resistance free voltage of said battery during said interruption of the said current at a point in time near the end of said preselected time interval of from about 0.5 to about 10 milliseconds;
(d) means independent of the battery being charged for electrically generating a preselected reference voltage;
(e) comparator means for comparing said internal resistance free voltage of said battery with said preselected reference voltage at said point in time and for producing an output logical error signal which is indicative of the value of said internal resistance free voltage compared to said reference voltage;
(f) logical memory means wherein said output logical error signal from the output of the said comparator means is entered during each preselected time interval; and
(g) electrical control means activated by said comparator means for gradually reducing said current during a second reduced power charging interval when said internal resistance free voltage exceeds said preselected reference voltage as indicated by said output logical error signal, whereby the rate of charging of said rechargeable battery at said point in time is reduced so as to maintain said internal resistance voltage at said preselected reference voltage.

44. A charger as claimed in 43 including a sample-and-hold circuit means as an analog memory means for accepting the value of the said internal resistance free potential near the end of said current interruption and to retain the value of said internal resistance free potential of said battery during said charging intervals between said current interruptions.

45. A charger as claimed in claim 43 wherein said logical memory means includes means to retain said logical error signal during said charging interval between said current interruptions.

46. A charger as claimed in claim 43 including an illuminatable lamp as a charge in progress indicator means connected to said control means, wherein when said lamp is constantly illuminated that is an indication that a charge at full rate is in progress; and when said lamp is a flashing lamp, that is an indication that a reduced rate charge is in progress.

47. A charger as claimed in claim 43 including a trickle charge circuit means in parallel with said D.C. current for rapidly charging said rechargeable battery for reaching the state of full charge faster, and for said trickle charge circuitry means to trickle charge said rechargeable battery when said internal resistance free voltage exceeds said preselected reference voltage.

* * * * *